United States Patent [19]
Brazas, Jr. et al.

[11] Patent Number: 5,212,759
[45] Date of Patent: May 18, 1993

[54] MODE INSENSITIVE WAVEGUIDE DEVICE

[75] Inventors: John C. Brazas, Jr.; Glenn E. Kohnke, both of Rochester, N.Y.

[73] Assignee: Eastman Kodak Company, Rochester, N.Y.

[21] Appl. No.: 808,705

[22] Filed: Dec. 16, 1991

[51] Int. Cl.$^5$ ................................................ G02B 6/10
[52] U.S. Cl. .................................. 385/130; 385/28; 385/29; 385/131; 385/129
[58] Field of Search ................... 385/28, 29, 129, 130, 385/131

[56] References Cited

U.S. PATENT DOCUMENTS

| | | | |
|---|---|---|---|
| 3,321,714 | 5/1967 | Tien | 385/36 X |
| 3,584,230 | 6/1971 | Tien | 385/36 X |
| 3,610,727 | 10/1971 | Ulrich | 385/130 X |
| 3,614,198 | 10/1971 | Martin et al. | 385/129 X |
| 3,617,109 | 11/1971 | Tien | 385/29 X |
| 3,659,916 | 5/1972 | Marcatili | 385/132 X |
| 3,864,019 | 2/1975 | Smolinsky et al. | 385/49 X |
| 3,905,676 | 9/1975 | Ulrich | 385/36 X |
| 3,944,326 | 3/1976 | Tacke et al. | 385/37 X |
| 3,948,583 | 4/1976 | Tien | 385/14 X |
| 4,047,801 | 9/1977 | Challeton et al. | 385/130 X |
| 4,087,159 | 5/1978 | Ulrich | 385/129 X |
| 4,204,742 | 5/1980 | Johnson et al. | 385/23 X |
| 4,255,018 | 3/1981 | Ulrich et al. | 385/12 X |
| 4,427,260 | 1/1984 | Puech et al. | 385/122 X |
| 4,678,266 | 7/1987 | Olego | 385/130 X |
| 4,701,009 | 10/1987 | Tangonan et al. | 385/14 X |
| 4,705,354 | 11/1987 | Ulrich | 356/345 |
| 4,749,245 | 6/1988 | Kawatsuki et al. | 385/130 X |
| 4,846,541 | 7/1989 | Miura et al. | 385/130 X |
| 5,106,211 | 4/1992 | Chiang et al. | 385/132 |
| 5,134,681 | 7/1992 | Ratovelomanana et al. | 385/130 |

*Primary Examiner*—Brian Healy
*Attorney, Agent, or Firm*—Robert Luke Walker

[57] ABSTRACT

A waveguide structure includes a substrate, a waveguide film, and an overlay material in contact with the waveguide film. The overlay material may also contact the substrate or the film may be disposed between the overlay and the substrate. The overlay material has a higher refractive index than the waveguide so that the ratio of the effective refractive indexes is substantially constant for all propagating modes supported by the waveguide.

20 Claims, 4 Drawing Sheets

MODE INSENSITIVE WAVEGUIDE DEVICE

TECHNICAL FIELD

The present invention relates generally to integrated optics, and, more particularly, relates to coupling light into slab waveguides of a multimode design.

BACKGROUND OF THE INVENTION

The use of multimode slab waveguides where overlay devices are used to perform geometrical optics on the propagating light is restricted because device operation is mode dependent. When multiple modes are excited within a waveguide, beam steering or focusing properties can vary significantly. This is a major concern where there is an optical axis along which there are additional devices having dimensions about the size of the beam, which typically occurs.

There are, however, several advantages of using waveguides supporting multiple modes. Often a thin-film preparation technique, required for some materials and their associated characteristics, will limit the thinness of resulting films and so result in the appearance of multiple propagation modes. These methods might include: flame hydrolysis of silicon dioxide doped films, dip-coating from sol-gel solutions or indiffusion of dopants into existing waveguides or substrates. It is desirable to have a waveguide structure that can operate with a thicker thin-film and take advantage of the benefits of thicker waveguide layers. Two of the benefits of using thicker waveguide layers are lower propagation losses and more efficient end-fire coupling of light from a fiber, laser diode, or microscope objective.

SUMMARY OF THE INVENTION

The present invention is directed to overcoming one or more of the problems set forth above. Briefly summarized, according to one aspect of the present invention, a waveguide structure includes a substrate, a waveguide film formed on the substrate, and an overlay material positioned on the waveguide film. The refractive index of the substrate, $n_s$, is less than the refractive index of the waveguide film, $n_w$, and the refractive index of the waveguide film, $n_w$, is less than the refractive index of the overlay material, $n_{ol}$. The overlay material is positioned on the waveguide film and has a higher refractive index than the waveguide so that the ratio of the effective refractive indices of the element region, $N_e$, to that of the waveguide region, $N_w$, is substantially constant for all propagation modes supported by the waveguide.

According to another aspect of the invention, a method for fabricating a waveguide structure having a substrate with a refractive index, $n_s$, and a waveguide film formed on the substrate with a refractive index, $n_w$, comprises selecting a substrate having a refractive index, $n_s$; forming a waveguide film having a refractive index, $n_w$, with $n_w$ being larger than $n_s$; and forming overlay material having a refractive index, $n_{ol}$, on the waveguide film with $n_{ol}$ being larger than $n_w$.

These and other aspects, objects, features and advantages of the present invention will be more clearly understood and appreciated from a review of the following detailed description of the preferred embodiments and appended claims, and by reference to the accompanying drawings,

DETAILED DESCRIPTION OF THE PREFERRED EMBODIMENTS

Figure 1:
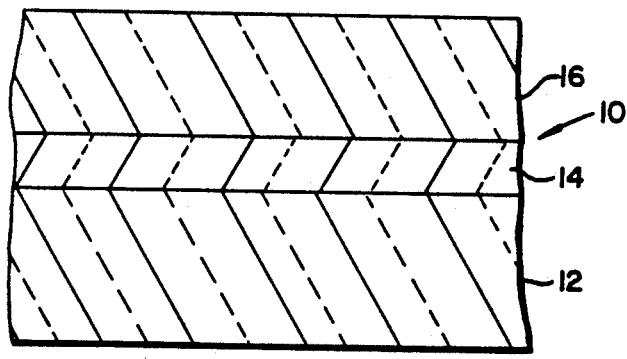
FIG. 1 is a diagrammatic sectional view of an embodiment of a conventional waveguide consisting of three layers.

Referring to FIG. 1, a three layer waveguide structure 10 includes a substrate 12, a waveguide film 14 formed on the substrate 12, and a cladding material 16 positioned on the waveguide film 14. The refractive index of the substrate 12 is less than the refractive index of the waveguide film 14, the refractive index of the cladding material 16 is less than the refractive index of the waveguide film 14, and the refractive index of the cladding material 16 is less than or equal to the refractive index of the substrate material 12 The cladding material 16 positioned on the waveguide film 14 can be substantially thicker than the film 14.

Figure 2:
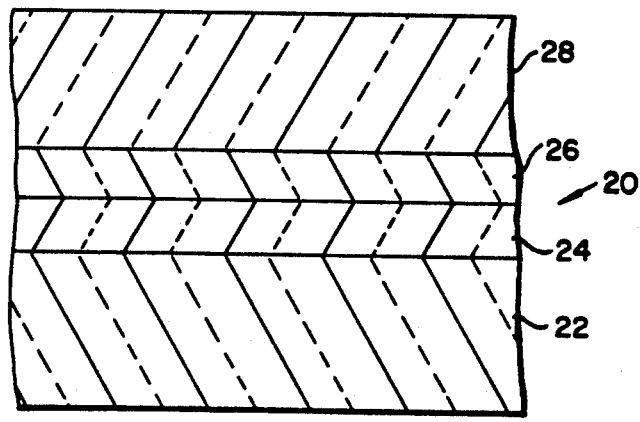
FIG. 2 is a diagrammatic sectional view of a preferred embodiment of a waveguide having four layers according to the present invention.

Referring to FIG. 2, a four layer waveguide structure 20 includes a substrate 22, a waveguide film 24 formed on the substrate 22, an overlay material 26 positioned on the waveguide film 24, and a cladding material 28 positioned on the overlay material 26. The refractive index of the substrate 22 is less than the refractive index of the waveguide film 24, and the refractive index of the waveguide film 24 is less than the refractive index of the overlay material 26. The refractive index of the cladding material 28 is less than the refractive index of the overlay material 26, and the refractive index of the cladding material 28 is less than or equal to the refractive index of the substrate 24. The cladding material 28 is positioned on the overlay material 26 and waveguide film 24 and has a lower refractive index than the waveguide film 24 and overlay 26.

Figure 3:
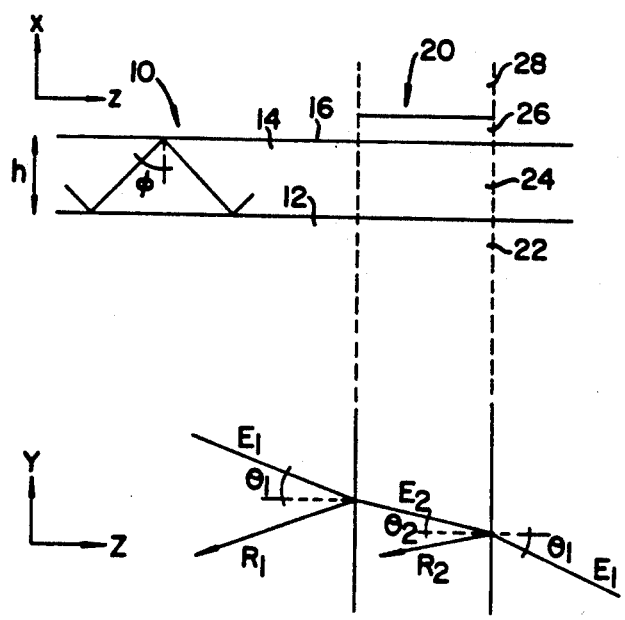
FIG. 3 is a diagram of the layered waveguides of FIGS. 1 and 2 illustrating geometric optics within the waveguide, a ray trace for waveguide mode propagation, and the reflection and refraction of light in the plane of the waveguide for regions of different N.

Referring to FIG. 3, a drawing of light guided in a slab waveguide, such as devices 10 or 20, is shown. The ray trace represents the propagation of a wavefront totally internally reflected at the film boundaries. The propagation of electromagnetic energy is characterized by a projected wave vector, $\beta$, on the z-axis and is defined $$\beta m = \frac{2\pi}{\lambda} n_w \sin\phi_m \quad (1)$$

where $\lambda$ is the wavelength of light, $n_w$ is the waveguide refractive index, and $\phi$ is the propagation angle. For a waveguide system, defined by the refractive indices and the thicknesses of the layers and the wavelength and polarization of light, discrete values of $\beta$ are allowed and termed the propagation modes indicated by m. These values are derived by the phase effects of boundary conditions at the film interfaces and the round-trip propagation distance of a reflection cycle within a waveguide having a refractive index $n_w$.

The effective refractive index, $N_w$, of a waveguide assembly is the ratio of the velocity of light in vacuo to that in the waveguide. Creating patterned regions of differing N is the basis of constructing devices to perform geometrical optics. $N_{wm}$ is defined by the propagation angle $\phi$ specific to a mode m and waveguide refractive index $n_w$ where $$N_{wm} = n_w \sin\phi_m \quad (2)$$

The $N_{wm}$ value impacts the propagation of light in the two dimensions within the plane of a slab waveguide just as the real refractive index affects the propagation of light in the three dimensions of bulk material.

When multiple modes are excited within a waveguide, beam steering or focusing properties can vary significantly if the film assembly is not designed properly. This is a major concern if there is an optical axis along which there are additional devices having dimensions about the size of the beam.

In the examples that follow, devices were designed to refract light at the device boundaries while eliminating modal dispersion by having the angle of refraction the same for all modes of propagation. The devices 20 were created by the addition of an overlay material 26, having a higher index, to form a device pattern on a waveguide 24 of lower index. The device design is optimized for a specific waveguide thickness and the existing modes therein by selecting a corresponding overlay thickness where the ratio of the waveguide N, $N_{wm}$, and the overlay N, $N_{dm}$, is nearly equivalent for all modes existing within the waveguide $$\frac{N_{d0}}{N_{w0}} = \frac{N_{d1}}{N_{w1}} = \frac{N_{d2}}{N_{w2}} = \ldots \frac{N_{dm}}{N_{wm}} \quad (3)$$

This ratio is termed the normalized N in the discussion and figures below and is useful for considering the refracting power of any single device.

Figure 4:
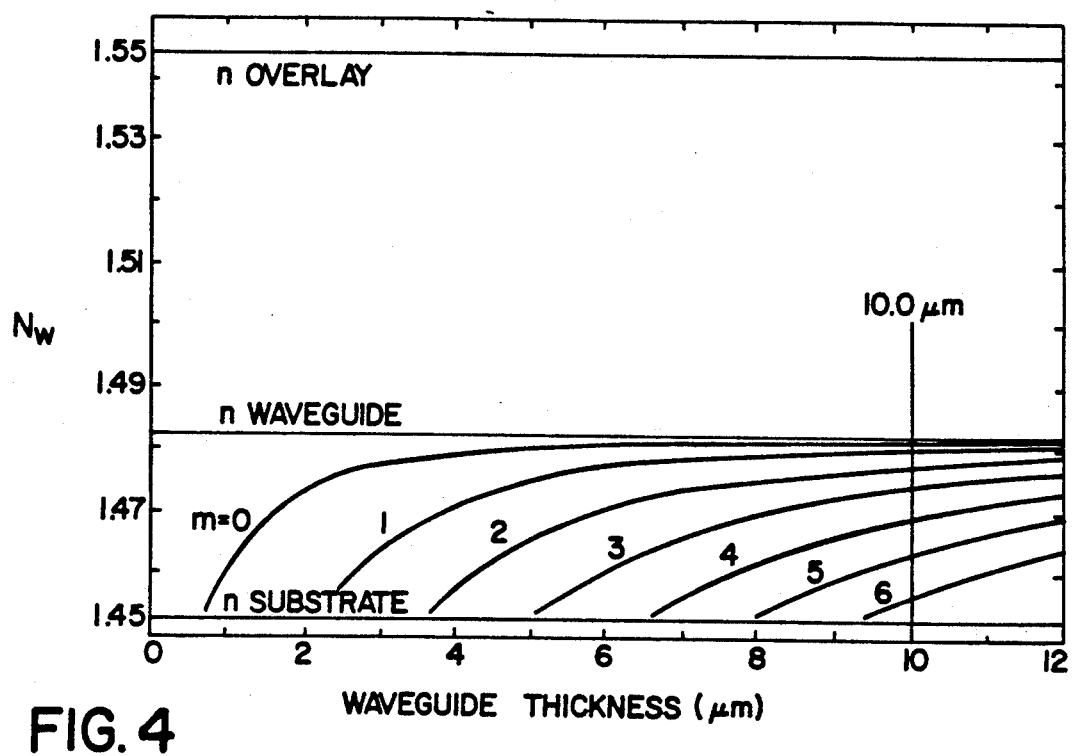
FIG. 4 graphically illustrates the thickness dispersion for $N_w$ for the three layer thin-film waveguide assembly of FIG. 1.
Figure 5:
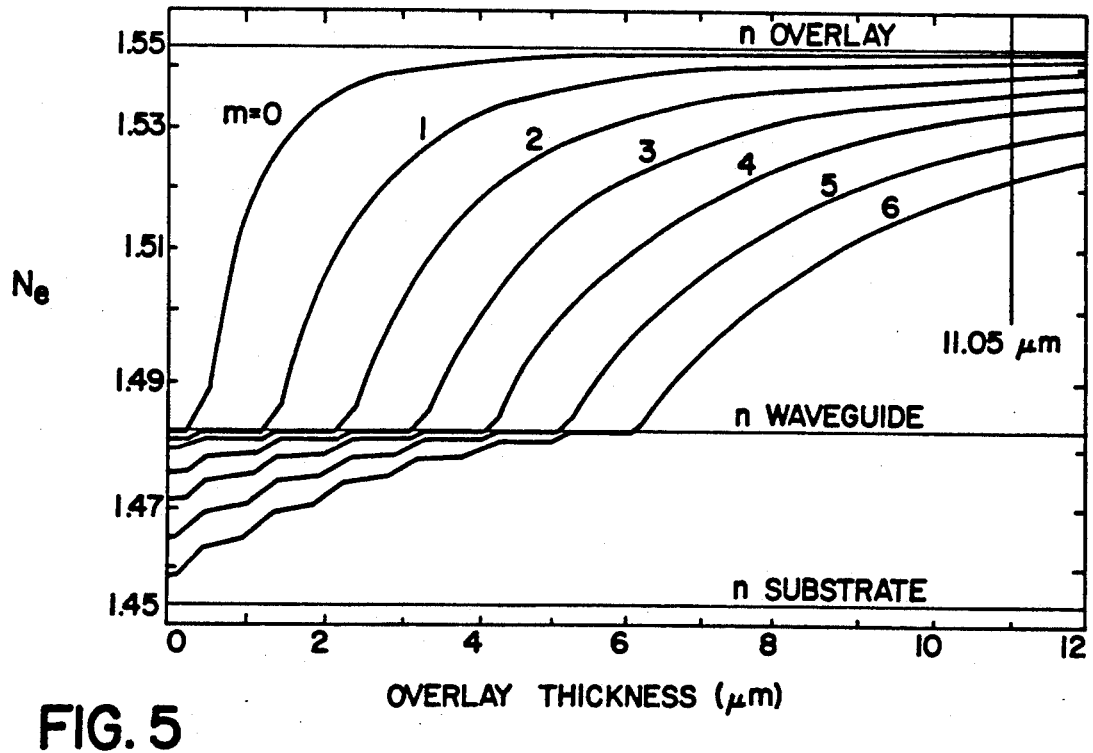
FIG. 5 graphically illustrates the first seven modes of thickness dispersion for $N_e$ for the assembly of FIG. 2.
Figure 6:
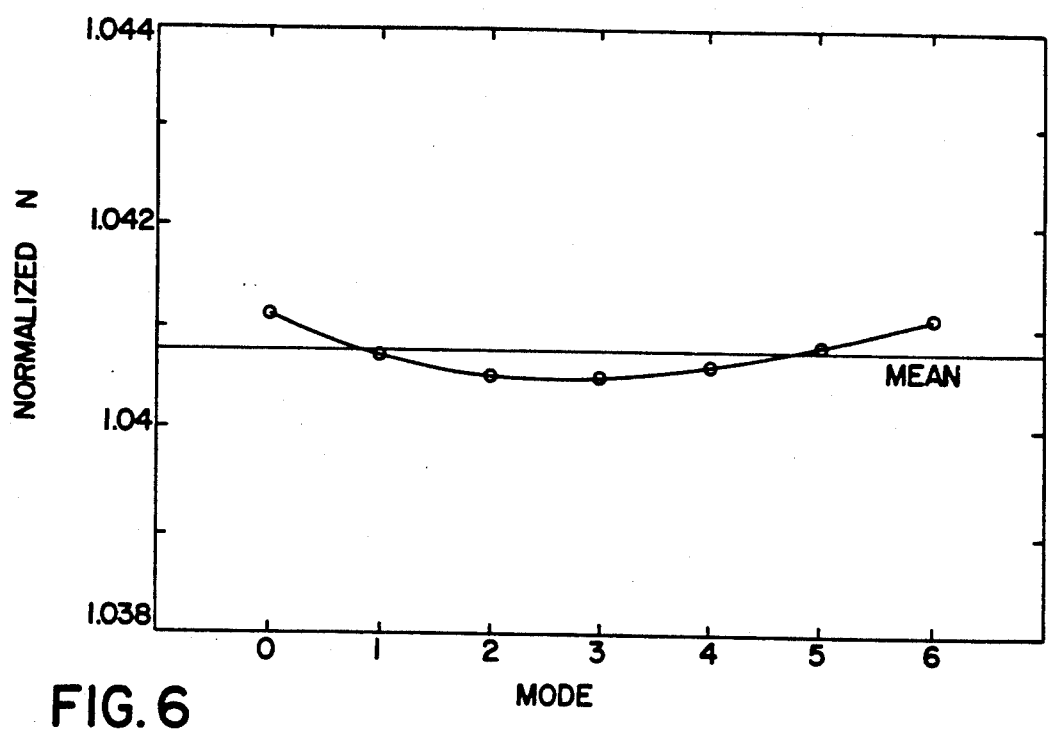
FIG. 6 graphically illustrates normalized N values at the optimum overlay thickness for each mode for a first exemplary device.
Figure 9:
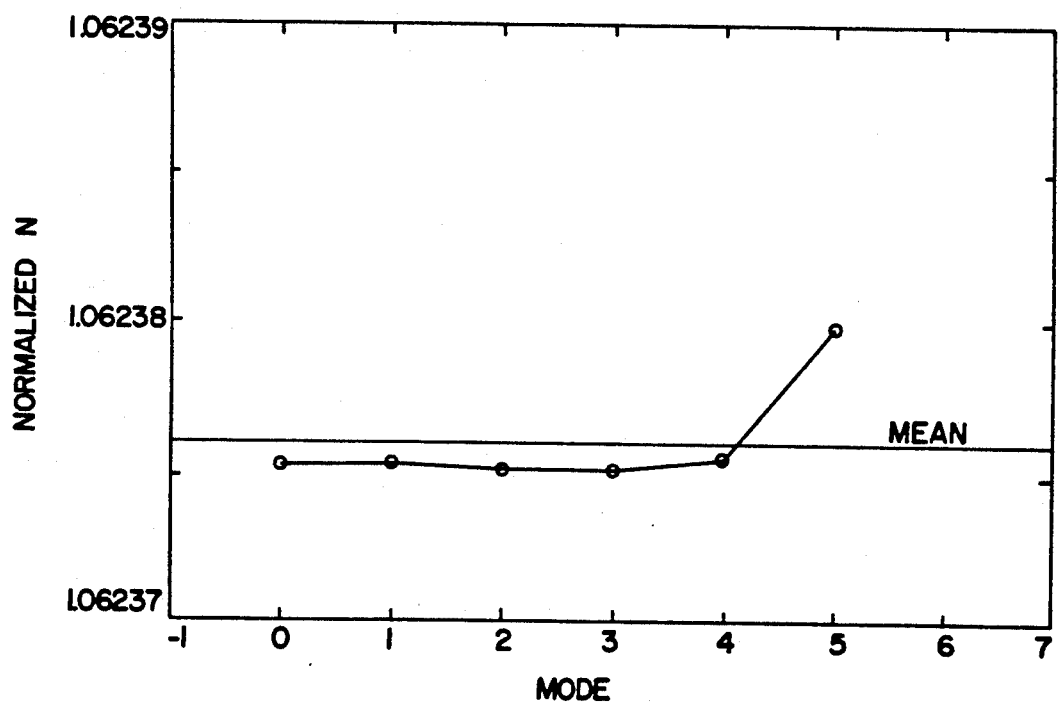
FIG. 9 graphically illustrates normalized N values at the optimum overlay thickness for each mode for the second example device.

In the first example, initially, the three layer model 10 was used to calculate the $N_w$ that results for the light contained within the waveguide 14. The wavelength used was 830 nm, and the thin film assembly is shown in FIG. 1. The waveguide 14, $n_w = 1.482$, was prepared on a substrate 12 of silicon dioxide, $n_s = 1.453$. These materials could represent the assembly formed by flame hydrolysis. The thickness dispersion of $N_w$ was calculated for the seven modes and is presented in FIG. 4 where $n_w = 1.544$. Next, $N_d$ was calculated for the four layer assembly 20 of FIG. 2 where $n_{ol} = 1.544$. Setting the waveguide thickness to 10 $\mu$m and calculating the thickness dispersion of $N_d$ produces the results of FIG. 5. Only the first seven modes are shown although additional modes could exist. Finally, a search for the condition of Eq. 3 over the range of thickness values of the overlay 26 was completed and an 11.05 $\mu$m thick overlay film was found to provide the least modal dispersion. The normalized N values, having a standard deviation of $1.9 \times 10^{-4}$ from the mean value, are plotted in FIG. 6.

As the refractive index of the waveguide 24 approaches that of the overlay film 26, the functions describing the thickness dispersion for each mode of the three layer and four layer assemblies become more similar. Finally, they reach the limit of being identical and the four layer system would be analyzed as a three layer system. Realistically however, a difference in indices is required to simultaneously meet the condition of Eq. 3 and maintain the basis of device operation (i.e., $N_{dm} \neq N_{wm}$). With these principles in mind, the assembly 20 with the least variation of the normalized N should be an assembly 20 where the waveguide index has about the same difference in value to the index of the overlay 26 as to the index of the substrate 22.

Figure 7:
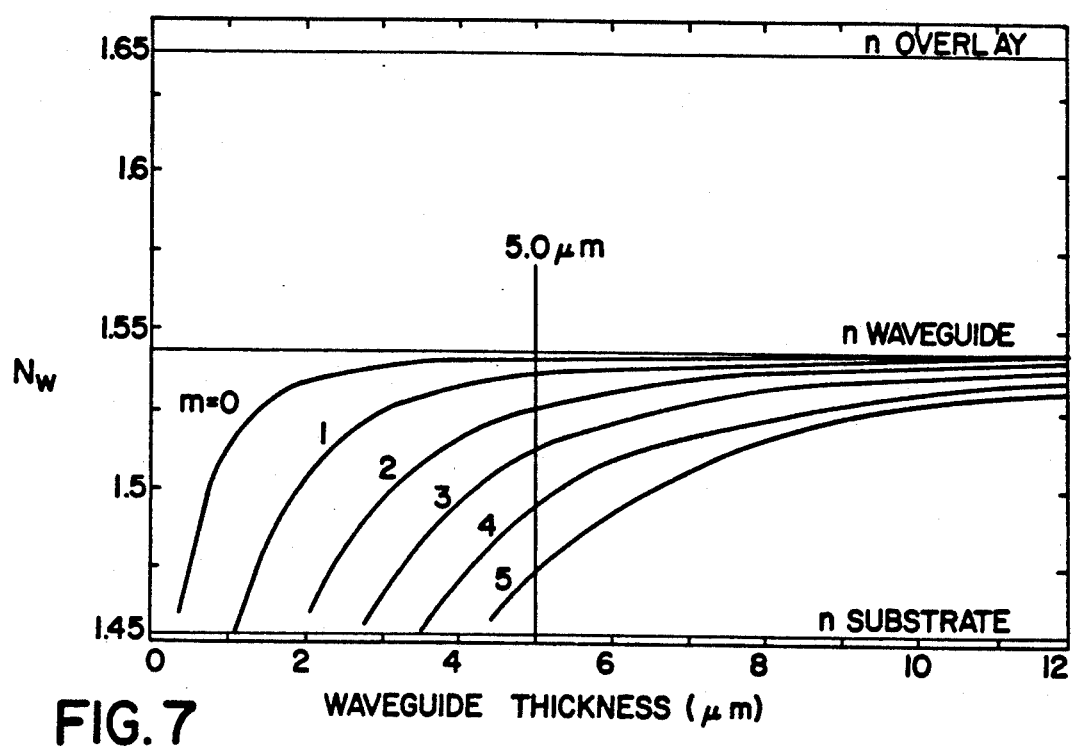
FIG. 7 graphically illustrates the thickness dispersion for $N_w$ for the assembly in FIG. 1 for a second exemplary device.
Figure 8:
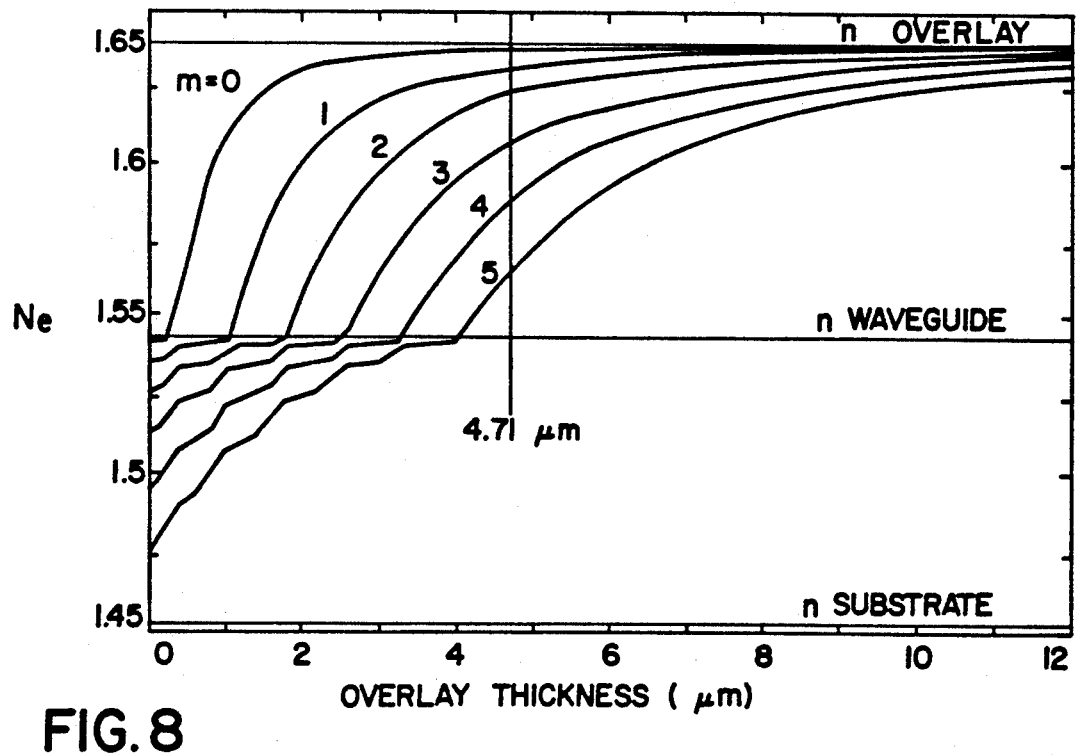
FIG. 8 graphically illustrates the thickness dispersion for $N_e$ for the first six modes for the waveguide assembly in FIG. 2 for the second exemplary device.

In the second example, this concept is demonstrated again using the film assembly of FIGS. 1 and 2. The N dispersion of the three and four layer assemblies are shown in FIGS. 7 and 8, respectively. A waveguide where $n_w = 1.544$ and having a selected thickness of 5 $\mu$m supported six modes of propagation. The overlay where $n_{ol} = 1.6$ had a thickness of 4.71 $\mu$m for the least modal dispersion.

For both examples, the deviation from the mean values is a demonstration of the design of a system having reduced model dispersion. The second example demonstrates an improved situation over that of the first example in that the refractive index of the waveguide is more near the average of $n_s$ and $n_{ol}$. When fewer modes are considered, the deviation of normalized N values will also be smaller and the thickness of the overlay will differ to reduce the deviation, especially for the cases of the first example.

It will now be appreciated that the present invention is a waveguide assembly fabricated in accordance with design rules herein described that control the sensitivity of waveguide device performance to the presence of multiple modes of propagation. With the present invention, it is possible to dramatically reduce the modal dispersion for all the modes supported by the waveguide or to create the specific dispersion desired for separation of light based on its mode of propagation.

The construction of the four layer waveguide assembly 20 has assumed the addition of the overlay 26 to an existing waveguide 24. It should be understood that it is possible to also invert the order of the waveguide layer 24 and overlay layer 26 in the fabrication process and still create a mode insensitive device.

While the invention has been described with particular reference to the preferred embodiments, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

It can be appreciated that a method has also been presented for fabricating a waveguide structure having a substrate with a refractive index, $n_s$, and a waveguide film with a refractive index, $n_w$, formed on the substrate. The method comprises the steps of selecting a substrate having a refractive index, $n_s$; forming on the base a waveguide film having a refractive index, $n_w$, with $n_w$ being larger than $n_s$; and forming on the waveguide film overlay material having a refractive index, $n_{ol}$, with $n_{ol}$ being larger than $n_w$.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An optical device, comprising:
   a waveguide having a film, said film having a first film and a second film boundary spaced from said first film boundary, said waveguide internally reflecting an electromagnetic wave at said film boundaries, said wave being characterized by a projected wave vector, $\beta$, on a z axis, where $$\beta m = \frac{2\pi}{\lambda} n_w \sin\phi_m$$

and where $\lambda$ is the wavelength of light, $n_w$ is the waveguide refractive index, and $\phi_m$ represents the propagation angles supported by said waveguide for defined modes, m, so that an effective refractive index, $N_{wm}$, of said waveguide is a function of $\phi$ and $n_w$ where $$N_m = n_w \sin \phi_m; \text{ and}$$

an overlay material positioned on said waveguide film and having a higher refractive index than said waveguide so that the ratio of the effective refractive indexes is substantially constant for all propagation angles, $\phi_m$, supported by said waveguide.

2. An optical device, as set forth in claim 1, including a substrate, said overlay material being formed on said substrate and disposed between said substrate and said film.

3. An optical device, comprising:
   a waveguide having a substrate and a film formed on said substrate, said film having a first film boundary adjacent said substrate and a second film boundary spaced from said substrate, said waveguide internally reflecting an electromagnetic wave at said film boundaries, said wave being characterized by a projected wave vector, $\beta$, on a z axis, where $$\beta m = \frac{2\pi}{\lambda} n_w \sin\phi_m$$

and where $\lambda$ is the wavelength of light, $n_w$ is the waveguide refractive index, and $\phi_m$ represents the propagation angles supported by said waveguide for defined modes, m, so that an effective refractive index, $N_{wm}$, of said waveguide is a function of $\phi$ and $n_w$ where $$N_m = n_w \sin \phi_m; \text{ and}$$

an overlay material positioned on said waveguide film and having a higher refractive index than said waveguide so that the ratio of the effective refractive indexes is substantially constant for all propagation angles, $\phi_m$, supported by said waveguide.

4. An optical device, as set forth in claim 3, wherein said waveguide has a thickness of 5 $\mu$m.

5. An optical device, as set forth in claim 3, wherein said waveguide supports six modes of propagation.

6. An optical device, as set forth in claim 3, wherein the overlay thickness for the least modal dispersion is 4.71 $\mu$m.

7. A waveguide structure, comprising:
   a substrate having a refractive index, $n_s$;
   a waveguide film formed on said substrate and having a refractive index, $n_w$, with $n_w$ being larger than $n_s$;
   an overlay material positioned on said waveguide film and having a refractive index, $n_{ol}$, with $n_{ol}$ being larger than $n_w$; and 8. A waveguide structure, as set forth in claim 7, wherein $n_c$ is less than $n_{ol}$.

9. A waveguide structure, as set forth in claim 7, wherein $n_c$ is less than $n_w$.

10. A waveguide structure, as set forth in claim 7, wherein $n_s = 1.453$.

11. A waveguide structure, as set forth in claim 7, wherein $n_w = 1.544$.

12. A waveguide structure, as set forth in claim 7, wherein $n_{ol} = 1.640$.

13. A method for fabricating a waveguide structure having a substrate and a waveguide film formed on the substrate, said substrate having a refractive index $n_s$, said waveguide film having a refractive index $n_w$, said method comprising:
    selecting a substrate having a refractive index, $n_s$;
    forming a waveguide film having a refractive index, $n_w$, with $n_w$ being larger than $n_s$;
    forming overlay material having a refractive index, $n_{ol}$, on the waveguide film with $n_{ol}$ being larger than $n_w$; and forming a cladding having a refractive index $n_c$ on said overlay.

14. A method, as set forth in claim 13, wherein $n_c$ is less than $n_{ol}$.

15. A method, as set forth in claim 13, wherein $n_c$ is less than $n_w$.

16. A waveguide structure, comprising:
    a substrate having a refractive index, $n_s$;
    a waveguide film formed on said substrate having a refractive index, $n_w$, with $n_w$ being larger than $n_s$;
    an overlay material positioned on said waveguide film and having a refractive index, $n_{ol}$, with $n_{ol}$ being larger than $n_w$, and
    $n_w$ is substantially equal to the average of $n_s$ and $n_{ol}$.

17. A waveguide structure, as set forth in claim 16, wherein $n_s$ is 1.453, $n_w$ is 1.482, and $n_{ol}$ is 1.544.

18. A waveguide structure, as set forth in claim 16, wherein $n_s$ is 1.453, $n_w$ is 1.544, and $n_{ol}$ is 1.650.

19. A method for fabricating a waveguide structure having a substrate and a waveguide film formed on the substrate, said method comprising:
    selecting a substrate having a refractive index, $n_s$;
    forming a waveguide film having a refractive index, $n_w$, with $n_w$ being larger than $n_s$;
    forming overlay material having a refractive index, $n_{ol}$, on the waveguide film with $n_{ol}$ being larger than $n_w$ and $n_w$ being substantially equal to the average of $n_s$ and $n_{ol}$.

20. A method for fabricating a waveguide structure having a substrate and a waveguide film formed on the substrate, said method comprising:
    selecting a substrate having a refractive index, $n_s$;
    forming overlay material having a refractive index, $n_{ol}$, on the substrate with $n_{ol}$ being larger than $n_s$; and
    forming a waveguide film having a refractive index, $n_w$, on the overlay material, with $n_{ol}$ being larger than $n_w$ and $n_w$ being substantially equal to the average of $n_s$ and $n_{ol}$.

* * * * *